United States Patent
Hines et al.

(10) Patent No.: US 10,657,416 B1
(45) Date of Patent: May 19, 2020

(54) METHOD AND SYSTEM FOR DETECTING DRIFT IN IMAGE STREAMS

(71) Applicant: Capital One Services, LLC, McLean, VA (US)

(72) Inventors: Keegan Hines, Washington, DC (US); Christopher Bayan Bruss, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/513,879

(22) Filed: Jul. 17, 2019

(51) Int. Cl.
*G06K 9/00* (2006.01)
*G06K 9/62* (2006.01)
*G06N 3/08* (2006.01)
*G06K 9/46* (2006.01)

(52) U.S. Cl.
CPC ......... *G06K 9/6226* (2013.01); *G06K 9/4604* (2013.01); *G06K 9/6256* (2013.01); *G06N 3/08* (2013.01)

(58) Field of Classification Search
CPC .. G06K 9/6226; G06K 9/6256; G06K 9/4604; G06N 3/08
See application file for complete search history.

(56) References Cited

U.S. PATENT DOCUMENTS

| | | | |
|---|---|---|---|
| 8,909,643 | B2 | 12/2014 | Ankan et al. |
| 2007/0177791 | A1 | 8/2007 | Shi et al. |
| 2011/0274361 | A1* | 11/2011 | Bovik .............. G06K 9/00664 382/224 |
| 2019/0213247 | A1 | 7/2019 | Pala et al. |

FOREIGN PATENT DOCUMENTS

CN 108446408 A 8/2018

OTHER PUBLICATIONS

Dec. 10, 2015—Deep residual learning for image recognition. Kaiming He et al. Microsoft Research.
2016. Chapter 14: Autoencoders. Goodfellow et al. Deep Learning. MIT Press. Available at http://www.deeplearningbook.org.
Apr. 10, 2015—Very deep convolutional networks for large-scale image recognition. Karen Simonyan et al. Visual Geometry Group, Department of Engineerign Science, University of Oxford.
Oct. 14, 2008—Dirichlet processes: A gentle tutorial. Khalid El-Arini. Select Lab Meeting.

(Continued)

*Primary Examiner* — Tom Y Lu
(74) *Attorney, Agent, or Firm* — Banner & Witcoff, Ltd.

(57) ABSTRACT

Methods and systems disclosed herein may quantify a representation of a type of input an image analysis system should expect. The image analysis system may be trained on the type of input the image analysis system should expect using a first image stream. A first model of the type of input that the image analysis system should expect may be built from the first image stream. After the first model is built, a second image, or a second image stream, may be compared to the first model to determine a difference between the second image, or second image stream, and the first image stream. When the difference is greater than or equal to a threshold, a drift may be detected and steps may be taken to determine the cause of the drift.

20 Claims, 12 Drawing Sheets

(56) References Cited

OTHER PUBLICATIONS

1997. Long short-term memory.Neural Computation. Sepp Hochreiter et al. pp. 1-32.

Jul., Oct. 1948—A mathematical theory of communication. The Bell System Technical Journal. C.E. Shannon. vol. 27. pp. 379-423, 623,656.

U.S. Appl. No. 15/514,009, filed Jul. 17, 2019, Method and System for Detecting Drift in Text Streams.

* cited by examiner

METHOD AND SYSTEM FOR DETECTING DRIFT IN IMAGE STREAMS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to detecting drift in image streams, and, more specifically, to quantifying the stability of image streams and alerting administrators to changes in image streams.

BACKGROUND

Many critical systems rely on the persistent accumulation of image data. However, these critical systems lack fail safes to monitor data streams of images in order to ensure that the incoming data streams are not corrupted or otherwise perturbed. That is, incoming data streams may change. This may be due to a change in the input or a problem with the input source. The systems in place to review, analyze, and classify the images contained in the data streams will continue to work; however, the classifications will be wrong. This problem of detecting corrupted, perturbed, or changing images is further complicated by the unstructured nature of images. In the context of banking, depositing checks at automated teller machines (ATMs) poses a unique problem due to the non-standardized nature of checks. In this regard, checks come in unique shapes and sizes and with various ornamental designs. New formats of checks cause system failures due to the systems inability to process the new formats. Likewise, varying camera systems may change the way the image of the check is digitized. Accordingly, there is a problem with existing systems detecting when input images deviate from the expected and notifying administrators of such deviations. Furthermore, it can be difficult to differentiate between a single anomalous input and a fundamental shift or change in the stream itself.

Aspects described herein may address these and other problems, and generally improve the quality, efficiency, and speed with which systems detect deviations in input image streams.

SUMMARY

The following presents a simplified summary of various aspects described herein.

This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Methods and systems as described herein may include quantifying a representation of a type of input an image analysis system may expect by training the image analysis system. Training may include providing the image analysis system with a first image stream that may be analyzed to generate a first model. The first model may establish a baseline representation of the types of features that the image analysis system should expect to receive in subsequent image streams. In practice, the first model may be created according to a probability distribution of the plurality of features found in the first image stream.

Once the first model is built, subsequently received images and image streams may be compared to determine whether the images and image streams are within a permitted variability. To accomplish this, subsequently received images and image streams may be analyzed. For images, a numeric representation may be generated that may be compared to the first model. For image streams, a second model may be generated and compared to the first model. Both comparisons may be made to determine whether the image, or image stream, is within a range of permitted variability. When the image, or image stream, falls within the range of permitted variability, it may be considered typical and the image analysis system continues reviewing images. However, when the image, or image stream, is outside the range of permitted variability, the image may be considered atypical and the image analysis system acts to determine the cause of the deviation. If a number of images in the input stream deviate in a similar way, the system may be able to further investigate whether a fundamental change has occurred to the way the input stream is being generated.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
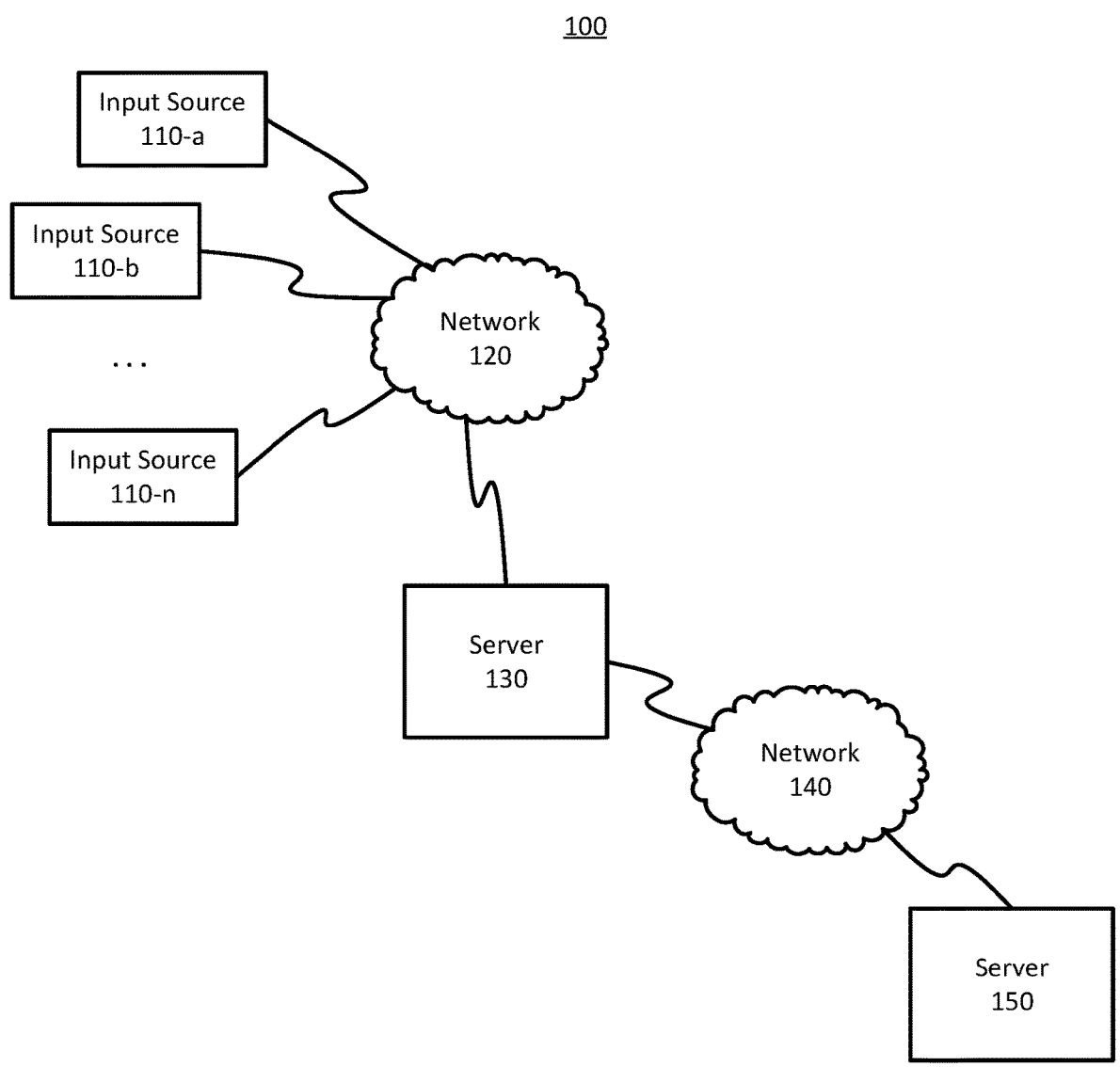
FIG. 1 shows an example of a system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for detecting drift in image streams. Image analysis systems may be used to identify and classify large streams of images. However, traditional image analysis systems may not be able to detect when the image stream may be changing in such a way that inaccurate and untrustworthy results are produced from the model. That is, the images in the stream may change, either due to a change in the input or a problem with the input source, and the image analysis system may not detect the change, which may result in a large number of inaccurate and untrustworthy classifications. The classifications will be useless and the analysis will have to be run again on a newly trained image analysis system, wasting processing time and energy. Thus, the inability of image analysis systems to detect when streams of images may be changing from what the image analysis systems should be expecting creates inefficiencies by wasting processing cycles on the inaccurate and untrustworthy classification of a changing image stream.

Methods and systems as described herein may include quantifying a representation of a type of input an image analysis system should expect. The image analysis system may be trained on the type of input the image analysis system should expect. This training may include providing the image analysis system with a first image stream. A numeric representation of each image in the first image stream may be generated. Each numeric representation may represent a plurality of features contained in each of the images in the first image stream. The numeric representations, and the plurality of features they represent, may be used to build a first model of the type of input that the image analysis system should expect. That is, the first model may establish a baseline representation of the types of features that the image analysis system should expect to receive in subsequent image streams. In practice, the first model may be created according to a probability distribution of the plurality of features found in the first image stream. Once the first model is built, the first model may be implemented by one or more image analysis systems to analyze incoming image streams.

The one or more image analysis systems may receive a second image stream. Much like the first image stream, a numeric representation for each image in the second image stream may be generated, which may result in a second plurality of numeric representations. An individual numeric representation from the second plurality of numeric representations may be compared to the first model to determine a difference between the image and the first image stream. When the difference is less than a threshold, the image may be considered typical and the image analysis system continues reviewing images in the second image stream. However, when the difference is greater than or equal to a threshold, the image may be considered atypical and the image analysis system acts to determine the cause of the drift. This may include a human-in-loop system for manual inspection of the image. Furthermore, if multiple images deviate in the same manner, this may indicate a change in the data source more substantial than a single atypical example.

Instead of determining whether individual images are expected or atypical, the one or more image analysis systems may determine if the second image stream fits within the first model. This determination may be used to determine if the entire second image stream is expected or atypical. In order to make this determination, the one or more image analysis systems may generate a second model from the second plurality of numeric representations. The second model may then be compared to the first model to determine a difference between the first image stream and the second image stream. When the difference is less than a threshold, the second image stream may be considered to fit the first model and, therefore, contains expected images. When the difference is greater than or equal to a threshold, the second image stream may be considered atypical and the image analysis system takes steps to determine why the second image stream is drifting from the first image stream.

The systems and methods described herein may improve image analysis systems by detecting when images begin to drift from a baseline of expected images. By establishing the baseline of expected input images and comparing subsequent images to the baseline, the image analysis system may be better suited to detecting drift in images and curtailing the inefficiencies realized by the inaccurate and untrustworthy classification of a changing image stream.

FIG. 1 shows a system 100. The system 100 may include a plurality of input sources 110 (i.e., 110-a, 110-b, ... 110-n) connected to first server 130 via first network 120. First server 120 may be connected to second server 150 through second network 140.

Input sources 110 may be any device capable of capturing an image and transmitting the captured image to a server, such as first server 130, via a network connection using the techniques described herein. As used herein, images include visual representations, as well as representations generated using wavelengths outside the spectrum of visible light, such as light detection and ranging (LIDAR) arrays. In this regard, input sources may include cameras, camera-arrays, scanners, camera-enabled mobile-devices, medical imaging devices, LIDAR arrays, satellite imagery, etc. According to some examples, input sources may include hardware and software that allow them to connect directly to first network 120. Alternatively, input sources 110 may connect to a local device, such as a personal computer, server, or other computing device, which connects to first network 120.

First network 120 may include any type of network. First network 140 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

First server 130 may be any server capable of executing an imaging analysis system that may be configured to process image streams using the techniques described herein. In this regard, first server 130 may be a stand-alone server, a corporate server, or a server located in a server farm or cloud-computer environment. According to some examples, first server 130 may be a virtual server hosted on hardware capable of supporting a plurality of virtual servers.

Much like first network 120, second network 140 may be any type of network. In some examples, second network 140 may be a corporate local area network (LAN) connecting first server 130 and second server 150. In other examples, second network 140 may include a site-to-site connection or dedicated lines that interconnect first server 130 and second server 150.

Similar to first server 130, second server 150 may be any server capable of processing the information and data contained in the image stream. In this regard, first server 130 and second server 150 may operate in parallel. Alternatively, first server 120 may process the image stream to detect any anomalies before transmitting the information to second server 150 for subsequent processing. In some examples, first server 130 and second server 150 may be co-located on the same device, located in the same cloud computing environment, or located in the same server farm.

The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
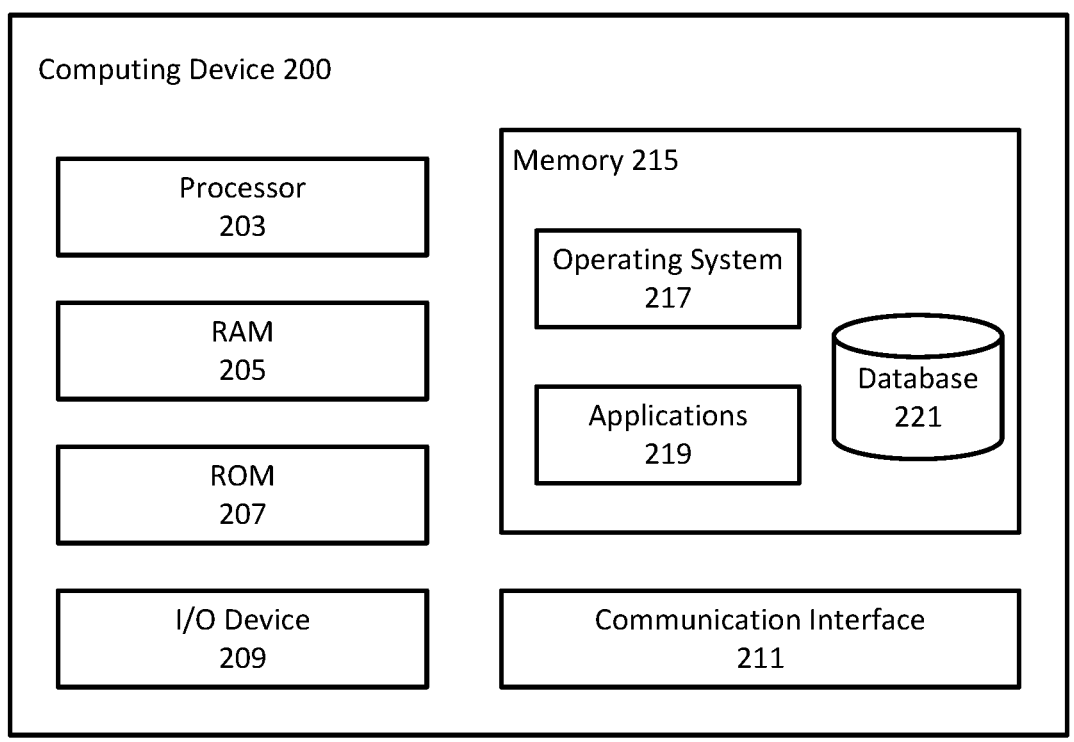
FIG. 2 shows an example computing device in accordance with one or more aspects described herein.

Any of the devices and systems described herein may be implemented, in whole or in part, using one or more computing systems described with respect to FIG. 2. Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus (now shown) may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. In examples where computing device 200 is an input source 110, I/O device 209 may include an image capture device, such as a camera, camera-arrays, scanners, camera-enabled mobile-devices, medical imaging devices, LIDAR arrays, satellite imagery, etc., Alternatively, I/O device 209 may provide a connection for transferring images from an image capture device to computing device 200.

Memory 215 may store software to provide instructions to processor 203 that allow computing device 200 to perform various actions. For example, memory 215 may store software used by the computing device 200, such as an operating system 217, application programs 219, and/or an associated internal database 221. As will be described in greater detail below, memory 215 may store software that permits processor 203 to analyze a plurality of images in an image stream and detect when the images begin to deviate from the established baseline representation. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein. When located at input source 110, communication interface 211 may be configured to transmit an image stream from input source 110 to first server 130. Similarly, communication interface 211 may be configured to receive an image stream from input source 110 and transmit processed images and a score associated with each image to another device when the communication interface 211 is located on first server 130.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
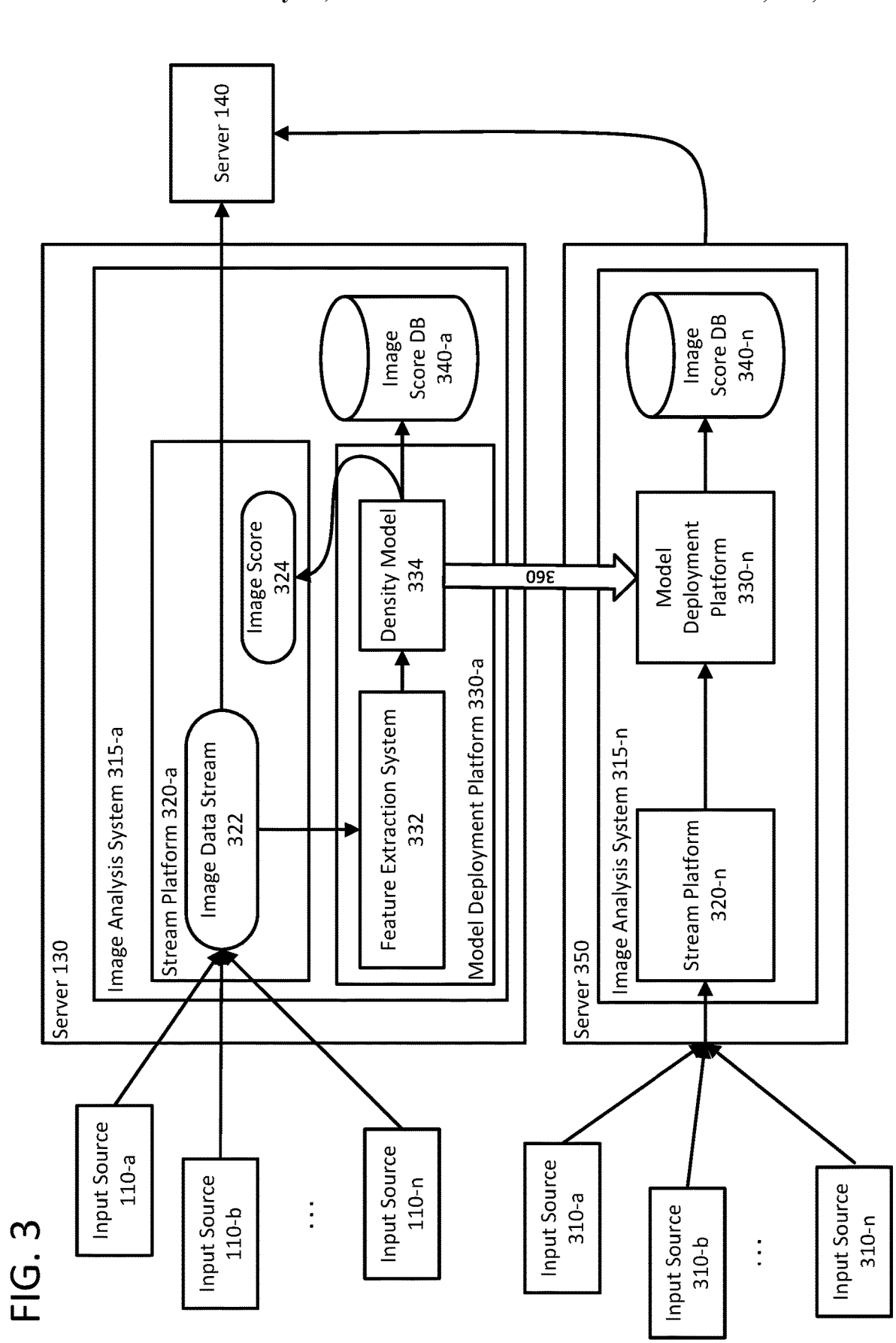
FIG. 3 shows an example of a server processing a stream of image in which one or more aspects described herein may be implemented.

As noted above, system 100 may be designed to detect when images in an image stream deviate from a baseline representation of the types of features that the image analysis system should expect to receive in subsequent image streams. FIG. 3 shows an example of a first image analysis system 315-*a* executing on first server 130 and a second image analysis system 315-*n* executing on second server 350.

First server 130 includes a first image analysis system 315-*a* that includes a stream platform 320-*a* and a model deployment platform 330-*a*. Second server 350 also includes a second image analysis system 315-*n*, with its own stream platform 320-*n* and model deployment platform 330-*n*. In this regard, first server 130 and second server 350 may be part of a large scale image analysis deployment, which includes any number of servers configured to execute image analysis system 315-*x*. In these examples, first server 130 and second server 350 may belong to the same organization, but be deployed in geographically disparate regions. Additionally or alternatively, second server 350 may be subordinate to first server 130. In these examples, model deployment platform 330-*a* may generate the first model and deploy the first model to model deployment platform 330-*n*, as illustrated by arrow 360. Regardless of which server they may be deployed on, image analysis system 315-*x*, stream platform 320-*x*, and model deployment platform 330-*x* may be similar in structure and operation. Further, image analysis system 315-*x*, stream platform 320-*x*, and model deployment platform 330-*x* may include software, hardware, firmware, or any combination thereof. For the sake of brevity, image analysis system 315-*x*, stream platform 320-*x*, and model deployment platform 330-*x* will be discussed with reference to first image analysis system 315-*a*, stream platform 320-*a*, and a model deployment platform 330-*a*.

Stream platform 320-*a* may be configured to receive an image data stream 322 from the one or more input sources 110-*a*, 110-*b*, . . . 110-*n*. After receiving image data stream 322, stream platform 320-*a* may transfer image data stream 322 to model deployment platform 330-*a*. In preferred embodiments, feature extraction system 332 may receive the image data stream from stream platform 320-*a*. Feature extraction system 332 may determine a numeric representation of the visual content for each image contained in image data stream 322. As noted above, the model deployment platform 330-*x* and, in particular, density model 334 may be distributed to a plurality of servers. In this regard, feature extraction system 332 and density model 334 may be replicated across one or more servers in the large scale image analysis deployment. By replicating feature extraction system 332 and density model 334 across a plurality of servers, the analysis of image data stream 322 discussed herein may be performed on a plurality of image streams in parallel. That is, each of the plurality of servers in the large scale image analysis deployment may perform the image analysis described herein on one or more image streams. Thus, each of the plurality of servers may operate in parallel to process a plurality of image streams.

In preferred examples, the numeric representation may be a feature vector, and, in particular, a fixed-length feature vector. Feature extraction system 332 may be configured to generate the numeric representation for each image using a deep convolutional neural network. In this regard, feature extraction system 332 may extract a plurality of features from each image using a variety of image analysis techniques. According to some examples, feature extraction system 332 may use transfer learning and rely on previously-trained deep convolution neural networks, such as ResNet or VGG16. In determining the numeric representation, feature extraction system 332 may process an image through the deep convolution neural network and extract the penultimate representation, or any intermediary representation, of the image as the numeric representation. Using the penultimate representation, or any intermediary representation, of the image as the numeric representation may be useful for transfer learning and using the numeric representation for new tasks. In order to obtain a baseline representation of image data stream 322, feature extraction system 332 may repeat the process of generating a numeric representation until a numeric representation for each image in image data stream 322 has been determined. Accordingly, feature extraction system 332 may output a plurality of numeric representations. By determining a numeric representation for each image in an image stream, feature extraction system 332 may be able to create a standardized representation for images of different dimensions and various content that can be used to create a baseline representation of image data stream 322.

Once a numeric representation is generated for each of the images contained in the image stream, feature extraction system 332 may transfer the plurality of numeric representations to density model unit 334. Density model unit 334 may be configured to generate a model from the plurality of numeric representations. That is, the plurality of numeric representations may be used to fit the density model. In preferred examples, the model may be a baseline representation of the images contained in image data stream 322. That is, the model may define how a typical image in image data stream 322 appears. The model may be generated using a probability distribution of information contained in the plurality of numeric representations. In particular, the information contained in the plurality of numeric representations may include features that commonly appear in the image stream. The probability distribution may be determined using a flexible density model, which may better account for variability within image data stream 322. Accordingly, valid probability densities, such as a Dirichlet Process mixture model, and non-normalized likelihood estimators, such as a deep autoencoder, may be used to determine the probability distribution for the model. Regardless of how it may be generated, the model may provide a measure of how likely typical images are and a technique for quantifying what types of images are unlikely.

Once the model is built, the model may be stored in image score database 340-*a*. Image score database 340-*a* may be unique to the server on which it is located. Alternatively, image score database 340-*a* and image score database 340-*n* may be a single, common memory location that stores image scores from image streams analyzed by the plurality of servers. As will be discussed in greater detail below, the model may be used as a benchmark for subsequently received streams of images. In these examples, a second image data stream may be received and processed as above. Accordingly, a second model may be generated from either a single image in the second image data stream or for the entirety of the second image data stream. The second model may be compared to the model to determine a difference between the information from the second image data stream and image data stream 322. The difference may be stored in image score database 340-*a*. Additionally, or alternatively, the difference may be represented by image score 324, which may be stored in image score database 340-*a*, as well as be provided to stream platform 320. In this regard, the image score may be an anomaly score or a likelihood score. Stream platform 320 may cause image score 324 to be displayed to a user, such as an administrator.

Figure 4:
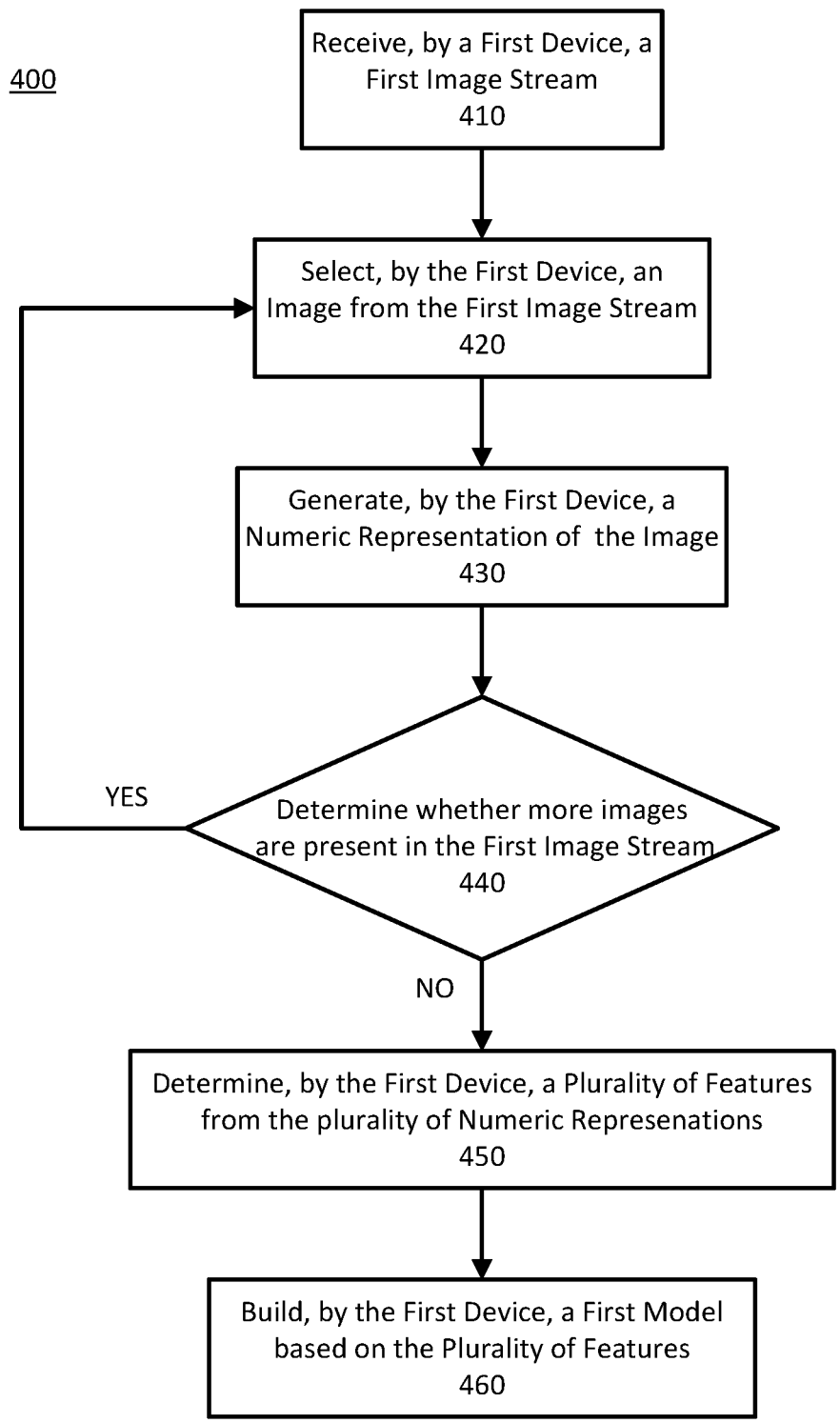
FIG. 4 shows a flow chart of a process for building a baseline model of the image stream according to one or more aspects of the disclosure.

Quantifying the visual content of a single image may be the first step in generating a model of an image stream. Once the visual content of a single image can be quantified, the process can be repeated to determine a dataset that can be used to generate the model of the image stream. FIG. 4 shows a flow chart of process 400 for quantifying the visual content for each of the images in an image data stream and building a first model of the image stream according to one or more aspects of the disclosure. Some or all of the steps of process 400 may be performed using one or more computing devices as described herein.

Process 400 begins in block 410, with a first device receiving a first image stream. As noted above, the first image stream may be received from a plurality of input sources. Alternatively, the first image stream may be received from a single input source. In some examples, the first image stream may be training data. The training data may be a compilation of real world examples. In the banking context, the first image stream may be obtained from one or more scanners. Accordingly, the first image stream may comprise a plurality of checks of varying shape, size, coloring, and languages. Additionally, the first data stream may include non-check images, such as domestic and foreign currency. In the medical imaging context, the first image stream may be generated by one or more medical imaging devices and include a plurality of medical images, such as x-rays, MRIs, CT scans, PET scans, etc. Further, the first image stream may be obtained by scanning equipment located on one or more vehicles, such as LIDAR. In this regard, the first image stream may be generated by one or more devices that create or handle a large number of images.

In block 420, the first device may select an image from the first image stream. After selecting an image from the first image stream, the first device may generate a numeric representation of the image in block 430. As noted above, the numeric representation may be a fixed, length feature vector, such as a 1024-dimensional vector. The feature vector may represent one or more features or attributes contained in the image. In block 440, the first device may determine whether there are more images present in the first image stream. When there are more images in the first image stream, process 400 may return to block 420 to repeat the process of generating numeric representations for each of the images contained in the first image stream. However, when there are no more images, process 400 may proceed to block 450.

In block 450, the first device may determine a plurality of features from the plurality of numeric representations. That is, the first device may determine a plurality of features or attributes common to each of the images in the first image stream. Additionally, or alternatively, determining a plurality of features from the plurality of numeric representations may include determining how frequently each of the plurality of features appears in the first image stream. Once the plurality of features is obtained from the plurality of numeric representations, the first device may build a first model based on the plurality of features in block 460. As discussed above, the model may be a density estimate model that indicates the probability of each of the plurality of features appearing in the first image stream. Accordingly, the model may provide a baseline representation of the first image stream that serves as a comparison point to which subsequently received image streams can be compared to detect a change in the input stream, a problem with the input source, or both.

Figure 5:
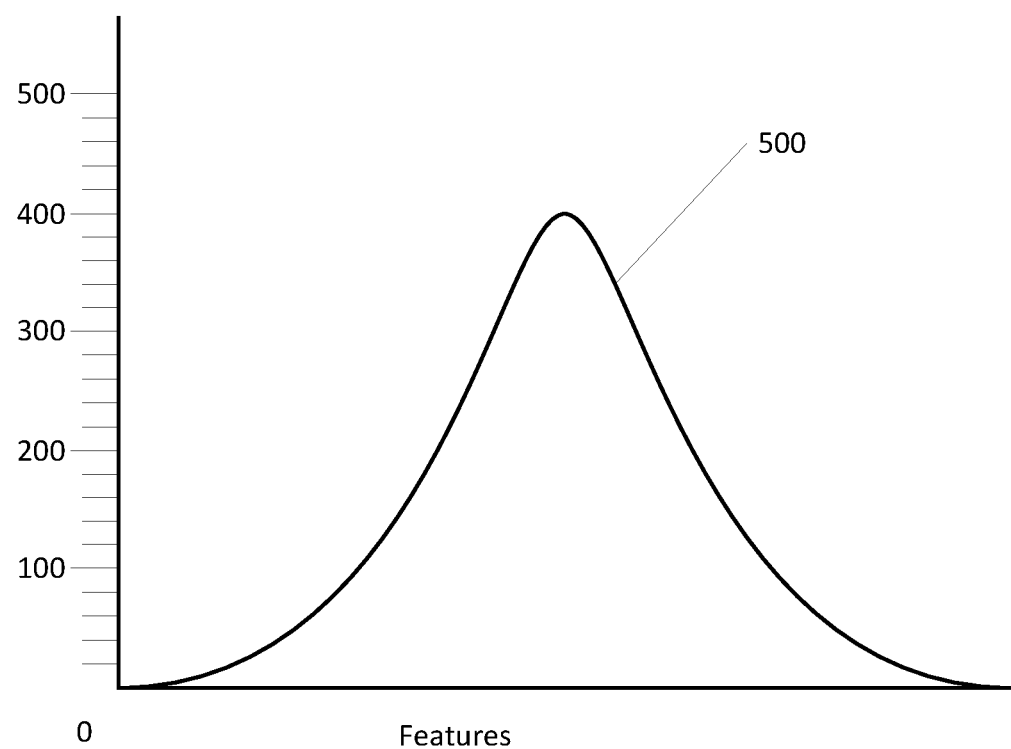
FIG. 5 shows an example of the baseline line model of the image stream in accordance with one or more aspects described herein.

The first model may represent a quantification of the first image stream. That is, the first model may serve as a compact representation of the visual content of the first image stream. FIG. 5 shows one example of model 500 generated to represent first image stream according to one or more aspects of the disclosure. The x-axis of model 500 may represent a plurality of features that are present in the first image stream, while the y-axis may represent how frequently each of the features represented in the x-axis occurs. In this regard, the most frequent features may appear in the middle of the x-axis, at the apex of the curve. The less frequently occurring features may be represented on either side of the curve in descending order. In the banking context, the most frequent features may include payer information, payee information, a signature, date, an amount, routing numbers, and account numbers, while less frequent features may include, for example, a description in a memo field, colors of the checks, images on the checks, and other personalized and customized features. Model 500, as shown in FIG. 5, represents a Gaussian distribution; however, any probability distribution may be used to model the first image stream, including an exponential distribution, a lognormal distribution, a gamma distribution, and a Rayleigh distribution.

Figure 6:
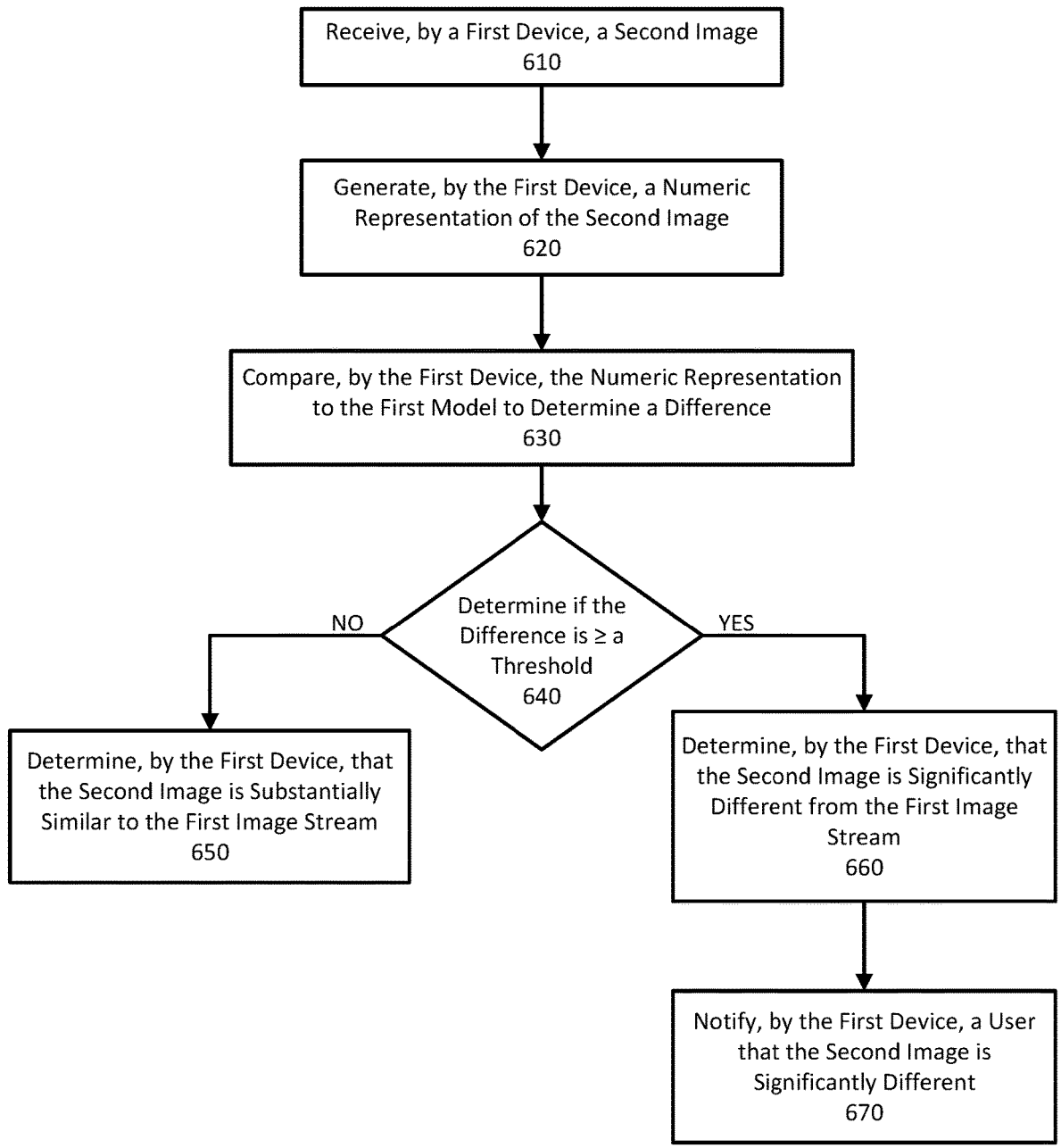
FIG. 6 shows a flow chart of comparing an image to the model to determine whether the image is similar to the first image stream according to one or more aspects of the disclosure.

Once a model of the first image stream has been generated, the model may be used as a control against which images can be compared. Such a comparison could be performed to determine whether an image may be similar to those contained in the first image stream. FIG. 6 shows a flow chart of a process for comparing an image to the first model to determine whether the image may be similar to the first image stream according to one or more aspects of the disclosure. Some or all of the steps of process 600 may be performed using one or more computing devices as described herein.

Process 600 begins in block 610 with the first device receiving a second image. The second image may be received from an input source, as discussed above. Alternatively, the second image may be selected from a second image stream. After receiving the second image, the first device may generate a numeric representation of the second image in block 620. The numeric representation may be a fixed-length vector that indicates one or more features of the second image. In block 630, the first device may compare the numeric representation of the second image to the first model to determine a difference between the second image and the first image stream. In preferred examples, the difference may be determined in real-time or near real-time (e.g., a delay of several seconds). The comparison may include fitting the numeric representation to the first model. If the second image is visually similar to the first data stream, the second image may receive a modest score that indicates that the second image is similar to the first image stream with a high degree of probability. If, on the other, the second image is starkly different from the first image stream, the second image may receive a low score that indicates that the second image is different from the first data stream. After determining the difference of the second image, the first device may determine whether the difference is greater than or equal to a threshold value in block 640. The threshold value may be set by a user or administrator. Additionally, or alternatively, the threshold value may be automatically determined by the system in accordance with mathematical principles. In this regard, the threshold value may indicate a degree of permitted variability between subsequent images and the first data stream. That is, the threshold value may define how different subsequent images may be from the first data stream. In this regard, the threshold value may be set at two standard deviations from a mean of the first model. The threshold value may be adjustable, based on the needs of the system. Accordingly, the threshold value may be set at one standard deviation from the mean in instances where a low degree of variability is expected. Alternatively, the threshold value may be set at three standard deviations when a high degree of variability is expected. In other examples, the threshold value may be a permitted margin of error.

When the difference is less than the threshold value, the first device may determine that the second image is substantially similar to the first image stream in block 650. In this context, substantially similar means that the second image is within the accepted range of tolerance (i.e., permitted variability) and is, therefore, similar to the images contained in the first image stream When the difference is greater than or equal to a threshold value, however, process 600 proceeds to block 660 where the first device may determine that the second image is significantly different from the first image stream, which may indicate a drift in the input and steps may be taken to determine the cause of the drift. Significantly different, in this context, means that the second image is outside the range of permitted variability defined by the system. To determine the cause of the drift, the first device may notify a user that the second image is significantly different in block 670. This notification may prompt the user to review the second image. Additionally, or alternatively, the notification may indicate a technical problem with the input source that requires attention. In some examples, the first device may issue one or more commands in an attempt to fix the input source and correct the cause of the detected drift. Additionally, or alternatively, the second image being significantly different from the first image stream may be recorded in a database. In this regard, a small number of second images (e.g., <50) that differ from the first image stream may be regarded as anomalies. That is, individual deviations and aberrations may be caused by random noise inherent in the image stream. These individual deviations and aberrations may be considered anomalies. However, a predetermined number of significantly different second images (e.g., >50) may indicate drift. When the predetermined number of significantly different second images have been detected, a clustering technique may be applied to the predetermined number of significantly different second images to determine whether there are recognizable groupings of deviations. For instance, the recognizable groupings of deviations may indicate a new type of check or a new scanner being used. In this regard, consistent patterns may indicate that the image stream is deviating, which may be indicative of a problem that requires an intervention, as described above.

Figure 7A:
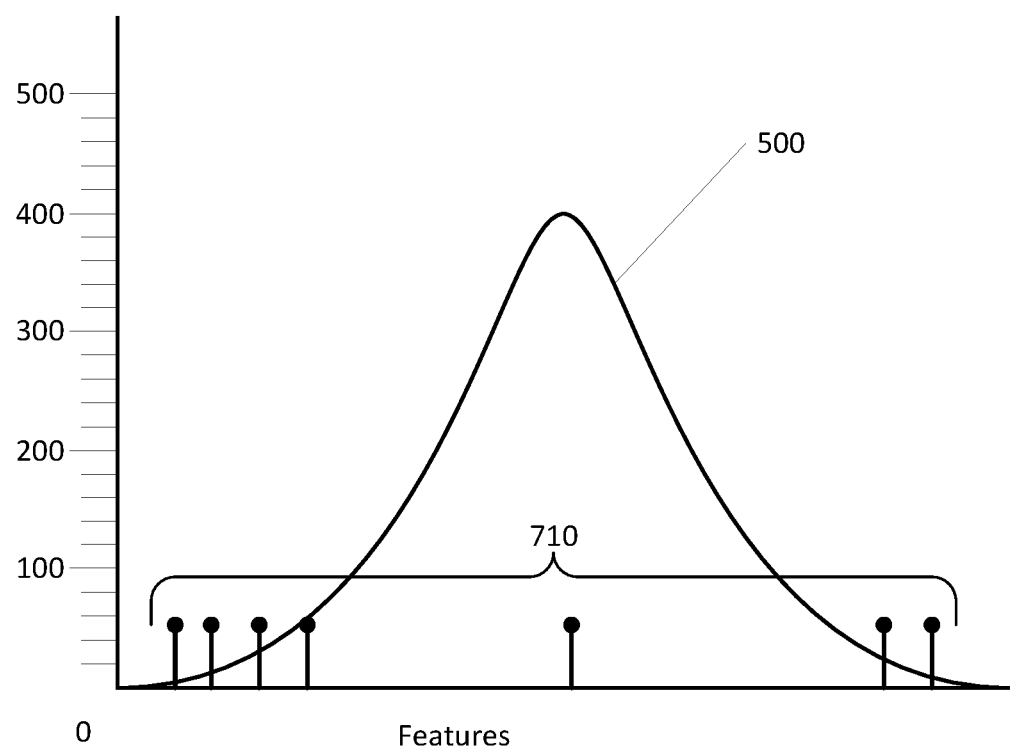
FIGS. 7A and 7B show examples of an image that does not fit the baseline model and an image that fits the baseline model, respectively, in accordance with one or more aspects described herein.
Figure 7B:
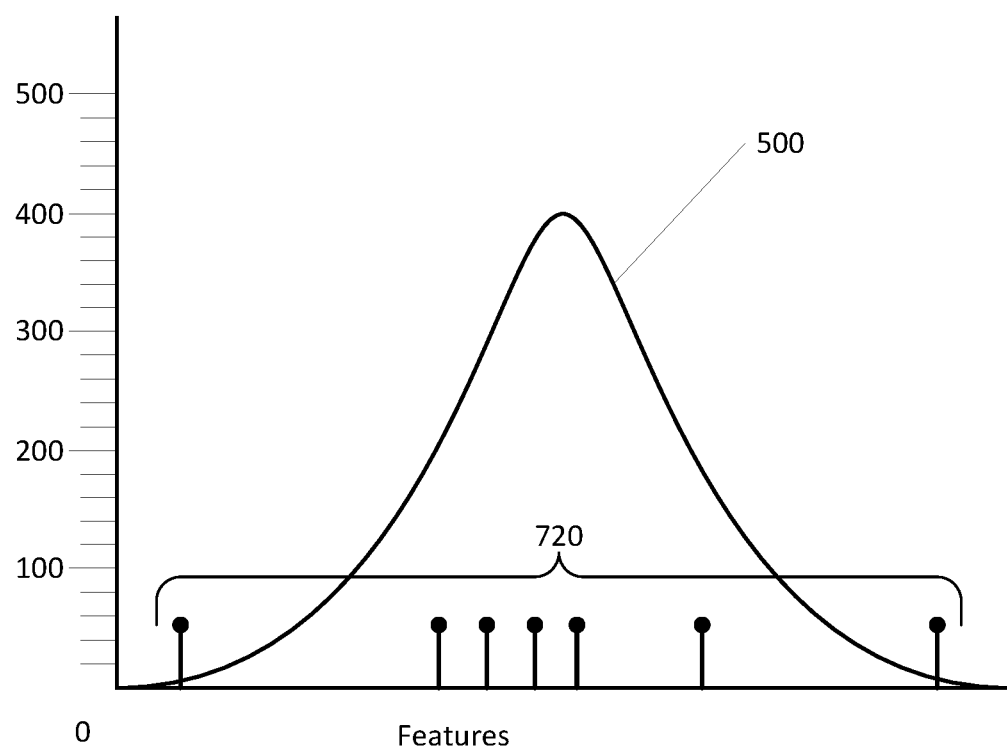

The process for comparing an image to the model to determine whether the image is similar to the first image stream may be useful in determining when the image begins to deviate from that which is expected by the system. The earlier a deviation is detected, the sooner an administrator can intervene to minimize the risk of improperly classifying images. FIGS. 7A and 7B show examples of an image that does not fit the first model and an image that fits the first model, respectively, in accordance with one or more aspects described herein.

Turning to FIG. 7A, model 500, as described above, is shown. Additionally, FIG. 7A includes first representation 710 of the second image. Representation 710 may include a plurality of features that do not correspond to a plurality of expected features. While first representation 710 includes a plurality of features, a significant number of the features of the second image appear on the outer limits of model 500. In examples where an image is compared to a model, a large number of features falling outside the range of permitted variability (e.g., >51%) may indicate that the image is atypical. Accordingly, the second image, illustrated in FIG. 8A, does not appear to include many of the features expected from model 500 based on first representation 710. Therefore, first representation 710 may be deemed significantly different from the first image stream, which in turn indicates a deviation from the baseline representation of the first image stream.

FIG. 7B, on the other hand, includes second representation 720 of the second image. As shown in FIG. 7B, second representation 720 may include a plurality of features that do correspond to a plurality of expected features. This is shown by the grouping of data points that fall under the bell curve. That is, a large number of features fall within the range of permitted variability. Accordingly, the second image that relates to second representation 720 may be deemed to be substantially similar to the first image stream.

Figure 8A:
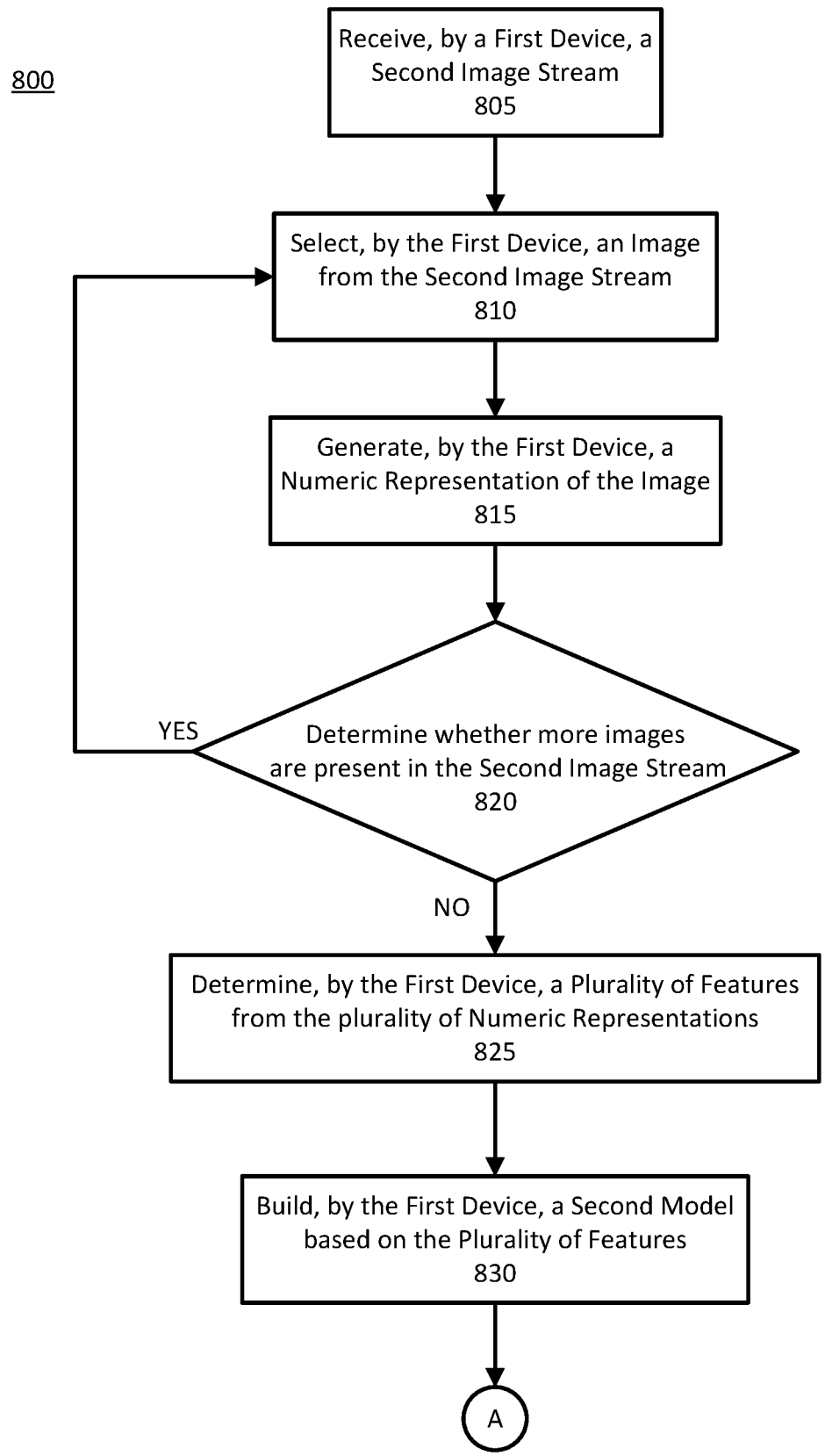
FIGS. 8A and 8B show a flow chart for comparing a second image stream to the baseline model in accordance with one or more aspects described herein.
Figure 8B:
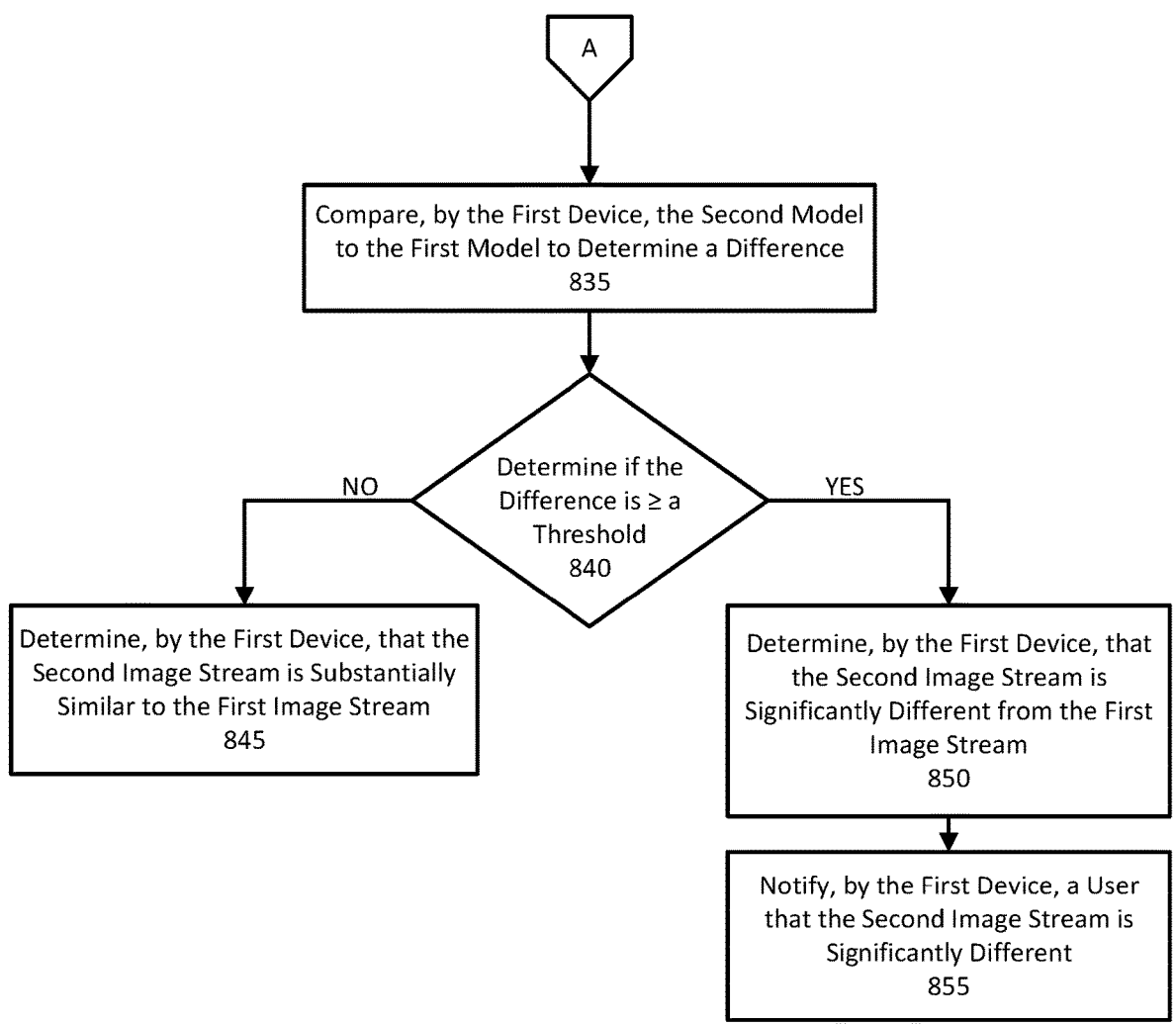

Detecting whether an image fits within the model may be useful to determine whether the image is similar to the first data stream. However, a single image may be too small of a sample size to adequately determine whether an input at an input source is changing. In this regard, the single image may be an outlier. In order to reliably determine whether an input was changing or whether there was an issue with an input source, the system may need to analyze a second image stream to determine that the input source was changing. FIGS. 8A and 8B show a flow chart of a process for comparing a second image stream to the baseline model according to one or more aspects of the disclosure. Some or all of the steps of process 800 may be performed using one or more computing devices as described herein.

Process 800 begins in block 805, with the first device receiving a second image stream. Similar to the first image stream, the second image stream may be received from a plurality of input source sources, such as cameras, camera arrays, scanners, medical imaging devices, LIDAR, or any device capable of capturing an image. In some instances, the second image stream may be smaller than the first image stream. In this regard, the first image stream may include hundreds or thousands of images. In comparison, the second image stream may only include tens or hundreds of images.

In block 810, the first device may select an image from the second image stream. In block 815, the first device may generate a numeric representation, such as a fixed length feature vector of the selected image. In block 820, the first device may determine whether there are more images in the second image stream. When there are more images in the second image stream, process 800 may return to block 810 to repeat the process of generating numeric representations for each image in the second image stream. This loop may continue until a numeric representation has been generated for each of the images in the second image stream, which results in a plurality of numeric representations. In block 825, the first device may determine a plurality of features from the plurality of numeric representations. In block 830, the first device may build a second model based on the plurality of features. Similar to the model discussed above, the second model may be a density estimate model that indicates the probability of each of the plurality of features appearing in the second images stream.

In block 835, the first device may compare the second model to the first model to determine a difference between the second image stream and the first image stream. Similar to the analysis of an individual image, the difference may be determined in real-time, or near real-time. The comparison may be performed by overlaying the second model over the first model to determine whether the second model fits the first model. In other examples, the comparison may be based on the difference between a first mean of the first model and a second mean of the second model.

In block 840, the first device may determine whether the difference is greater than or equal to a threshold value. The threshold value may be set either by a user or automatically by the system. As discussed above, the threshold value may define a degree of permitted variability between the second data stream and the first data stream. With respect to comparing streams of images, the threshold value may be set so that anomalies in the second image stream will not indicate drift. In this regard, second image stream may include a small number of images that may deviate and aberrate from the model. These deviations and aberrations may be classified as anomalies, which may be expected in a stream of images. However, drift may be detected when a statistically significant number of anomalies occur in an image stream. For example, at least 10% of the images in a stream of images being classified as anomalous may be indicative of drift. In these instances, the anomalous images may be tagged, or stored in a database, and subject to further analysis. For instance, clustering techniques may be used to determine whether there are any features common to the anomalous images. When there are common features amongst the anomalous images, the density model may be updated to include the features common to the anomalous images.

When the difference is less than the threshold value, the first device may determine that the second image stream is substantially similar to the first image stream in block 845. In this context, substantially similar means that the second image stream is within the permitted variability range and is, therefore, similar to the images contained in the first image stream. For example, if the mean of the second model is within a predetermined number of standard deviations of the mean of the first model, the second image stream may be deemed substantially similar to the first image stream.

Conversely, when the difference is greater than or equal to a threshold value, the first device may determine that the second image is significantly different from the first image stream in block 850. This determination may indicate a drift in the input and corrective steps may be taken to determine the cause of the drift. Significantly different, in this context, means that the second image stream is equivalent to, or outside, the range of permitted variability defined by the system. When the second image is outside the permitted variability range, the first device may notify a user that the second image stream is significantly different in block 855. In some examples, the user may determine that the cause of the drift may be due to a changing input and the first model may need to be updated. A new baseline model may be generated using the techniques described above with respect to FIG. 4. Alternatively, the second model may be set as the new baseline model. In further examples, a new baseline model may be generated from a combination of the first model and the second model.

Figure 9A:
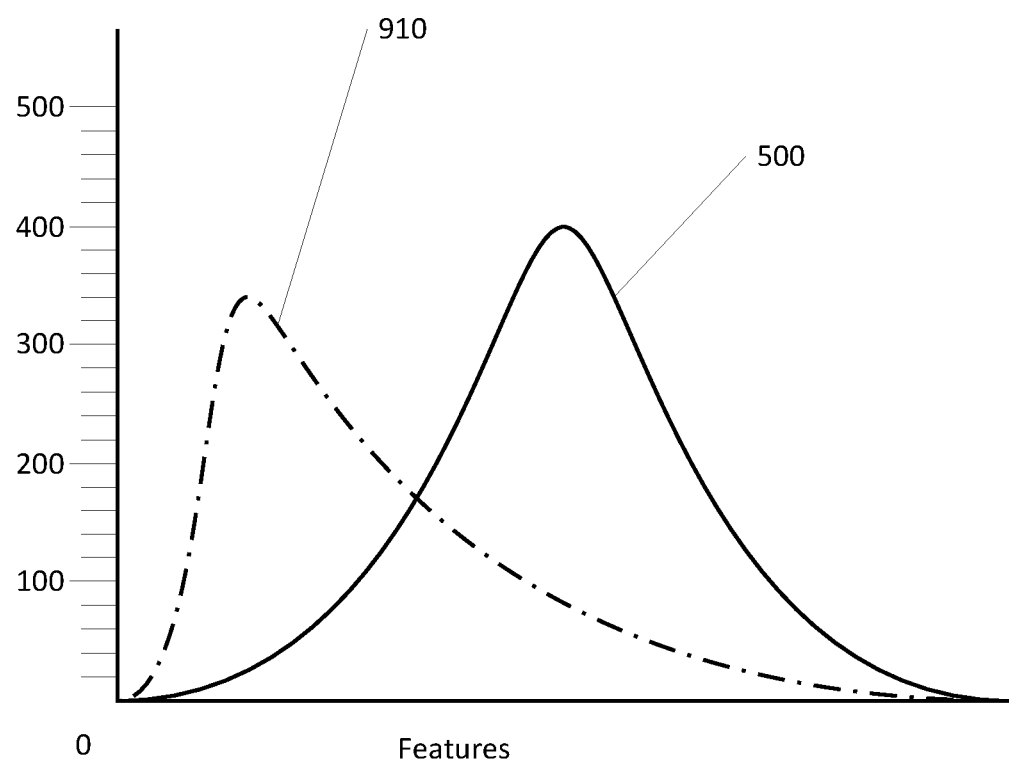
FIGS. 9A and 9B show an example of a subsequent image stream that does not fit the baseline model and a subsequent image stream that fits the baseline model, respectively, in accordance with one or more aspects described herein.
Figure 9B:
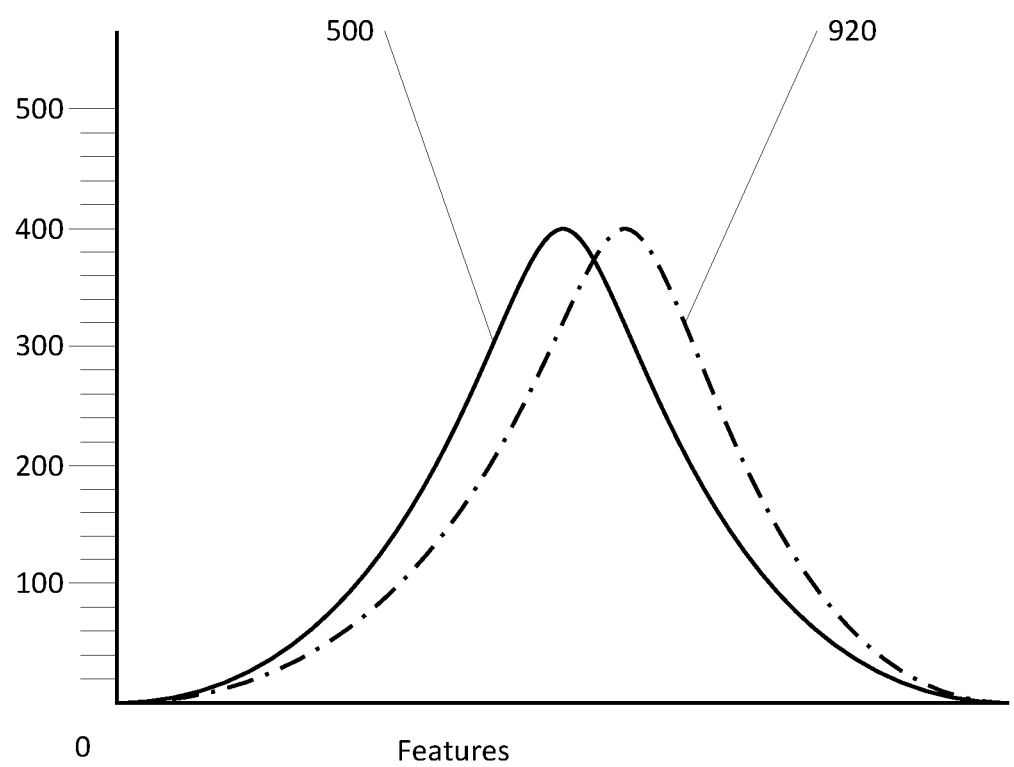

The process for comparing a second model of a second image stream to the first may be useful in determining when the image stream begins to deviate from that which is expected by the system. The earlier a deviation is recognized, the sooner an administrator can intervene to minimize the risk of improperly classifying images. FIGS. 9A and 9B show examples of a second image stream that does not fit the first model and a second image stream that fits the first model, respectively, in accordance with one or more aspects described herein.

Turning to FIG. 9A, model 500, as described above, is shown. Additionally, FIG. 9A includes first representation 910 of the second image stream. Representation 910 may be based off the second model and include a plurality of features that do not correspond to a plurality of expected features. In this regard, first representation 910 skews toward a different set of features than those that appear in first model 500. Accordingly, the second image stream does not appear to fit with what is expected based on the probability distribution represented by model 500. Since the second image stream does not appear to fit with the first model, first device may determine that the second image stream to be significantly different from the first image stream.

FIG. 9B, on the other hand, includes second representation 920 of the second image stream. As shown in FIG. 9B, second representation 920 fits within the first model 500. Based on the similarities between first model 500 and second representation 920, the first device may determine that the second image stream is substantially similar to the first image stream.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
   receiving, by a first device, a first image stream, wherein the first image stream comprises training data;
   determining, by the first device, a first numeric representation of a first image in the first image stream, wherein the first numeric representation quantifies visual content of the first image;
   determining, by the first device, a second numeric representation of a second image in the first image stream, wherein the second numeric representation quantifies visual content of the second image;
   determining, by the first device, a first plurality of features that appear in both the first numeric representation and the second numeric representation;
   building, by the first device, a first model using the plurality of features that appear in both the first numeric representation and the second numeric representation;
   receiving, by the first device, a second image stream, wherein the second image stream includes at least a third image and a fourth image;
   determining, by the first device, a third numeric representation of the third image, wherein the third numeric representation quantifies visual content of the third image;
   determining, by the first device, a fourth numeric representation of the fourth image, wherein the fourth numeric representation quantifies visual content of the fourth image;
   determining, by the first device, a second plurality of features that appear in both the third numeric representation and the fourth numeric representation;
   building, by the first device, a second model using the second plurality of features that appear in both the third numeric representation and the fourth numeric representation;
   comparing, by the first device, the second model to the first model to determine a difference between the second image stream and the first image stream; and
   indicating, by the first device, that the second image stream is significantly different from the first image stream when the difference is greater than or equal to a threshold, wherein significantly different indicates that the second image stream is outside a permitted variability from the first image stream.

2. The computer-implemented method of claim 1, wherein the threshold represents a permitted variability from the first image stream.

3. The computer-implemented method of claim 1, comprising:
   notifying, by the first device, an administrator that the second image stream is significantly different from the first image stream.

4. The computer-implemented method of claim 1, wherein determining the first numeric representation comprises:
   obtaining, from a neural network, a penultimate representation of the first image as the first numeric representation.

5. The computer-implemented method of claim 1, wherein the first model represents a probability distribution of the first plurality of features.

6. The computer-implemented method of claim 1, wherein the first model is built using density estimation.

7. The computer-implemented method of claim 1, comprising:
   indicating, by the first device, that the second image stream is substantially similar to the first image stream when the difference is less than the threshold, wherein the second image stream is substantially similar to the first image stream when the second image stream is within an accepted range of tolerance.

8. The computer-implemented method of claim 1, wherein the second image stream being significantly different from the first image stream represents an issue with an input source.

9. The computer-implemented method of claim 1, comprising:
   deploying, by the first device, the first model to a second device, wherein the second device uses the first model to evaluate a third image stream.

10. The computer-implemented method of claim 1, wherein the first model quantifies a baseline representation of data contained in the first image stream.

11. A system comprising:
    an interface configured to receive a plurality of image streams;
    one or more processors; and
    memory storing instructions that, when executed by the one or more processors, cause the one or more processors to:
      receive a first image stream, wherein the first image stream comprises training data;
      determine a first numeric representation of a first image in the first image stream, wherein the first numeric representation quantifies visual content of the first image;
      determine a second numeric representation of a second image in the first image stream, wherein the second numeric representation quantifies visual content of the second image;
      determine a first plurality of features that appear in both the first numeric representation and the second numeric representation;
      build a first model using the first plurality of features that appear in both the first numeric representation of the first image and the second numeric representation of the second image;

receive a second image stream, wherein the second image stream includes at least one of a third image and a fourth image;

determine a third numeric representation of the third image, wherein the third numeric representation quantifies visual content of the third image;

determine a fourth numeric representation of the fourth image, wherein the fourth numeric representation quantifies visual content of the fourth image;

determine a second plurality of features that appear in both the third numeric representation and the fourth numeric representation;

build a second model using the second plurality of features that appear in both the third numeric representation and the fourth numeric representation;

compare the second model to the first model to determine a difference between the second image stream and the first image stream; and indicate that the second image stream is significantly different from the first image stream when the difference is greater than or equal to a threshold, wherein significantly different indicates that the second image stream is outside a permitted variability from the first image stream.

12. The system of claim 11, wherein the first numeric representation is a fixed-length feature vector.

13. The system of claim 11, wherein the instructions cause the one or more processors to:

notify an administrator that the second image stream is significantly different from the first image stream.

14. The system of claim 11, wherein determining the first numeric representation comprises processing the first image using a neural network.

15. The system of claim 11, wherein the first model represents a probability distribution of the first plurality of features.

16. The system of claim 11, wherein the instructions cause the one or more processors to:

indicate that the second image stream is substantially similar to the first image stream when the difference is less than the threshold.

17. The system of claim 11, wherein the second image stream being significantly different from the first image stream represents an issue with an input source.

18. The system of claim 11, wherein the instructions cause the one or more processors to:

deploy the first model to a second device, wherein the second device uses the first model to evaluate a third image stream.

19. The system of claim 11, wherein the first model quantifies a baseline representation of data contained in the first image stream.

20. One or more non-transitory media storing instructions that, when executed by one or more processors, cause the one or more processors to perform steps comprising:

receiving, from an input source, a first image stream, wherein the first image stream comprises training data;

determining a first feature vector for a first image in the first stream using a neural network, wherein the first feature vector quantifies visual content of the first image;

determining a second feature vector for a second image in the first stream using the neural network, wherein the second feature vector quantifies visual content of the second image;

determining a first plurality of features that appear in both the first feature vector and the second feature vector;

building a first model to represent a baseline representation of the visual content of the first image stream using density estimation to plot the plurality of features based on how often each of the plurality of features appear;

receiving a second image stream, wherein the second image stream includes at least a third image and a fourth image;

determining a third feature vector for the third image using the neural network, wherein the third feature vector quantifies visual content of the third image;

determining a fourth feature vector for the fourth image using the neural network, wherein the fourth feature vector quantifies visual content of the fourth image;

determining a second plurality of features that appear in both the third feature vector and the fourth feature vector;

building a second model using the second plurality of features that appear in both the third feature vector and the fourth feature vector;

comparing the second model to the first model to determine a difference between the second image stream and the first image stream;

indicating that the second image stream is significantly different from the first image stream when the difference is greater than or equal to a threshold, wherein significantly different indicates that the second image stream is outside a permitted variability from the first image stream;

notifying an administrator that the second image stream is significantly different from the first image stream; and issuing at least one command to the input source to correct a cause of the difference between the second image stream and the first image stream.

* * * * *